(12) United States Patent
Wu et al.

(10) Patent No.: US 9,327,748 B2
(45) Date of Patent: May 3, 2016

(54) SUPPORTING BRACKET AND MEDICAL CART

(71) Applicant: MELTEN corporation, Taipei (TW)

(72) Inventors: Fang-Chi Wu, Taipei (TW); Yu-Min Cho, Taipei (TW); Jian-Yuan Lai, Taipei (TW)

(73) Assignee: MELTEN corporation, New Taipei (TW)

( * ) Notice: Subject to any disclaimer, the term of this patent is extended or adjusted under 35 U.S.C. 154(b) by 0 days.

(21) Appl. No.: 14/622,927

(22) Filed: Feb. 16, 2015

(65) Prior Publication Data
US 2016/0052533 A1 Feb. 25, 2016

(30) Foreign Application Priority Data

Aug. 21, 2014 (TW) .............................. 103214954 U

(51) Int. Cl.
B62B 3/02 (2006.01)
B62B 3/00 (2006.01)
A47B 97/00 (2006.01)

(52) U.S. Cl.
CPC ................. *B62B 3/002* (2013.01); *A47B 97/00* (2013.01); *A47B 2097/006* (2013.01)

(58) Field of Classification Search
CPC ................... A47B 2097/005; A47B 2097/006; A47B 97/00; A61G 12/001; F16M 11/10; F16M 2200/063; Y10S 248/917; Y10S 248/918; B62B 2202/56; B62B 3/002
See application file for complete search history.

(56) References Cited

U.S. PATENT DOCUMENTS

| | | | | |
|---|---|---|---|---|
| 4,844,387 | A * | 7/1989 | Sorgi et al. | 108/5 |
| 6,595,922 | B1 * | 7/2003 | Henderson et al. | 600/437 |
| 2007/0001076 | A1 * | 1/2007 | Asamarai et al. | 248/281.11 |
| 2009/0166501 | A1 * | 7/2009 | Wang et al. | 248/419 |
| 2009/0212670 | A1 * | 8/2009 | Bustle et al. | 312/209 |
| 2010/0114367 | A1 * | 5/2010 | Barrett et al. | 700/236 |
| 2010/0258688 | A1 * | 10/2010 | Wang et al. | 248/125.1 |
| 2012/0267497 | A1 * | 10/2012 | Bowman et al. | 248/280.11 |
| 2013/0009034 | A1 * | 1/2013 | Fallows | 248/575 |
| 2013/0271939 | A1 * | 10/2013 | De Jong et al. | 361/809 |
| 2013/0284871 | A1 * | 10/2013 | Huang | 248/282.1 |
| 2015/0053829 | A1 * | 2/2015 | Lu | 248/123.11 |

* cited by examiner

Primary Examiner — John Walters
Assistant Examiner — Brian Swenson
(74) Attorney, Agent, or Firm — Jianq Chyun IP Office

(57) ABSTRACT

A supporting bracket is suitable for standing on a working platform and adapted to hold an electronic device having a screen and provide illumination. The supporting bracket includes a base, a supporting arm apparatus, and a lighting device. The base is suitable for being fixed to the working platform. The supporting arm apparatus has a first segment and a second segment. One end portion of the first segment is connected to the base. The first segment is able to rotate relative to the base. One end portion of the second segment is connected to the other end portion of the first segment. The other end portion of the second segment serves to hold the electronic device. The second segment is able to rotate relative to the first segment. The lighting device is fixed to the supporting arm apparatus to provide illumination.

15 Claims, 9 Drawing Sheets

SUPPORTING BRACKET AND MEDICAL CART

CROSS-REFERENCE TO RELATED APPLICATION

This application claims the priority benefit of Taiwan application serial no. 103214954, filed on Aug. 21, 2014. The entirety of the above-mentioned patent application is hereby incorporated by reference herein and made a part of this specification.

FIELD OF THE INVENTION

The invention relates to a supporting bracket capable of holding an electronic device and providing illumination and a medical cart which employs the supporting bracket.

DESCRIPTION OF RELATED ART

Paramedics may move the medical carts to wards, so as to directly assist in patients. Since the time required by the paramedics for going back and forth between the wards and the workstations is reduced, the efficiency of nursing work can be improved. During the nighttime, if the paramedics intend to assist in patients in the wards, the paramedics often turn on the lighting devices for sufficient illumination, so as to ensure that the medical assistance can be done accurately.

Owing to the great brightness of the lighting devices in the wards, the patients taking a rest may be disturbed more or less. To resolve the issue, some paramedics may use flashlights for illumination purposes instead of turning on the lighting devices in the wards. Alternatively, a fixed-type lighting tool may be directly arranged on the medical cart for illumination purposes.

SUMMARY OF THE INVENTION

The invention is directed to a supporting bracket suitable for standing on a working platform and adapted to hold an electronic device and provide illumination.

In an embodiment of the invention, a supporting bracket suitable for standing on a working platform is provided, and the supporting bracket is adapted to hold an electronic device having a screen and provide illumination. The supporting bracket includes a base, a supporting arm apparatus, and a lighting device. The base is suitable for being fixed to the working platform. The supporting arm apparatus has a first segment and a second segment. One end portion of the first segment is connected to the base. The first segment is rotatable relative to the base. One end portion of the second segment is connected to the other end portion of the first segment. The other end portion of the second segment serves to hold the electronic device. The second segment is rotatable relative to the first segment. The lighting device is fixed to the supporting arm apparatus to provide illumination.

In an embodiment of the invention, a medical cart that includes a body, a working platform, a plurality of wheels, and said supporting bracket is provided. The working platform is arranged on a top portion of the body. The wheels are arranged on a bottom portion of the body. The supporting bracket stands on a working platform for holding an electronic device and providing illumination, and the electronic device has a screen.

In view of the above embodiments, the electronic device may be moved or rotated to the required position through the supporting bracket; what is more, the lighting device can also be moved to the required location through the supporting bracket. The single supporting bracket is capable of performing two kinds of functions.

Several exemplary embodiments accompanied with figures are described in detail below to further describe the invention in details.

DETAILED DESCRIPTION OF DISCLOSED EMBODIMENTS

At present, the medical cart has been developed to provide electronic medical services if the medical cart is used together with a computer and peripheral apparatuses. A display or a notebook computer used together with the electronic medical cart is often arranged above or around a working platform, such that the working space on the working platform is sufficient. In the following embodiments, a supporting arm apparatus that can be in various postures is adopted. The supporting arm apparatus is able to hold the electronic device having a screen, e.g., a display or a notebook computer; through changing the posture of the supporting arm apparatus, the electronic device is moved, and thereby the required view angle of the electronic device can be obtained. Besides, the lighting device may be fixed to a movable portion of the supporting arm apparatus; therefore, through changing the posture of the supporting arm apparatus, the lighting device can be moved, and thereby the lighting device can be placed at a required lighting position.

Figure 1A:
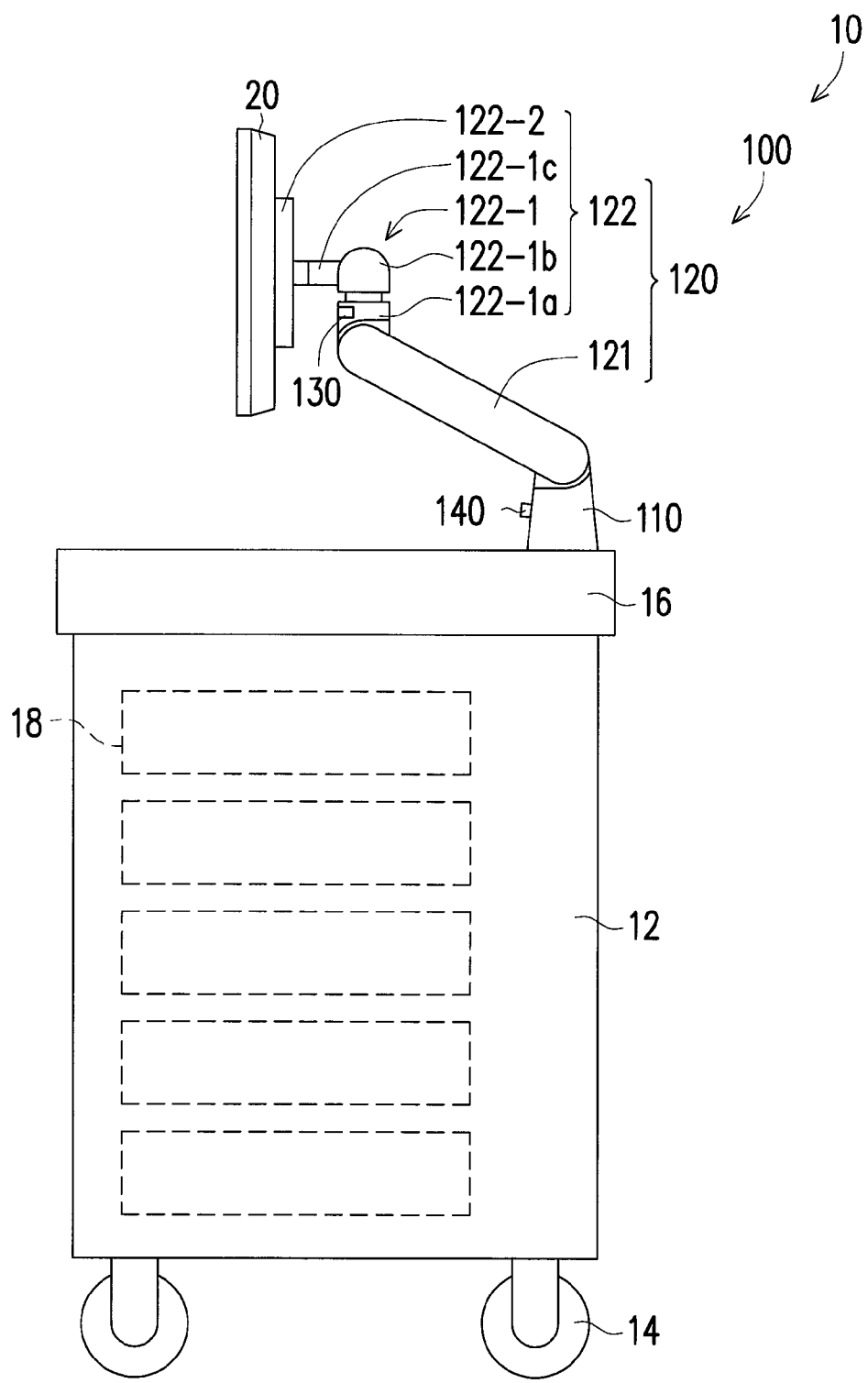
FIG. 1A is a side view illustrating a supporting bracket applied to a medical cart according to an embodiment of the invention.

With reference to FIG. 1A, in the present embodiment, the supporting bracket 100 is suitable for standing on a working platform 16 of a medical cart 10 for holding an electronic device (e.g., the display 20 shown in FIG. 1A) and providing illumination, and the electronic device has a screen. However, the invention is not limited thereto, and the supporting bracket 100 can be applied to other working platforms for other purposes of use. The supporting bracket 100 includes a base 110, a supporting arm apparatus 120, and a lighting device 130. The base 110 is suitable for being fixed to the working platform 16. The supporting arm apparatus 120 is connected to the base 110. The lighting device 130 is fixed to the supporting arm apparatus 120. According to the present embodiment, the medical cart 10 not only includes the working platform 16 but also comprises a body 12 and a plurality of wheels 14. The working platform 16 is arranged on a top portion of the body 12, and the wheels 14 are arranged on a bottom portion of the body 12. The body 12 of the medical cart 10 has a plurality of pill boxes 18 for holding pills.

Figure 1B:
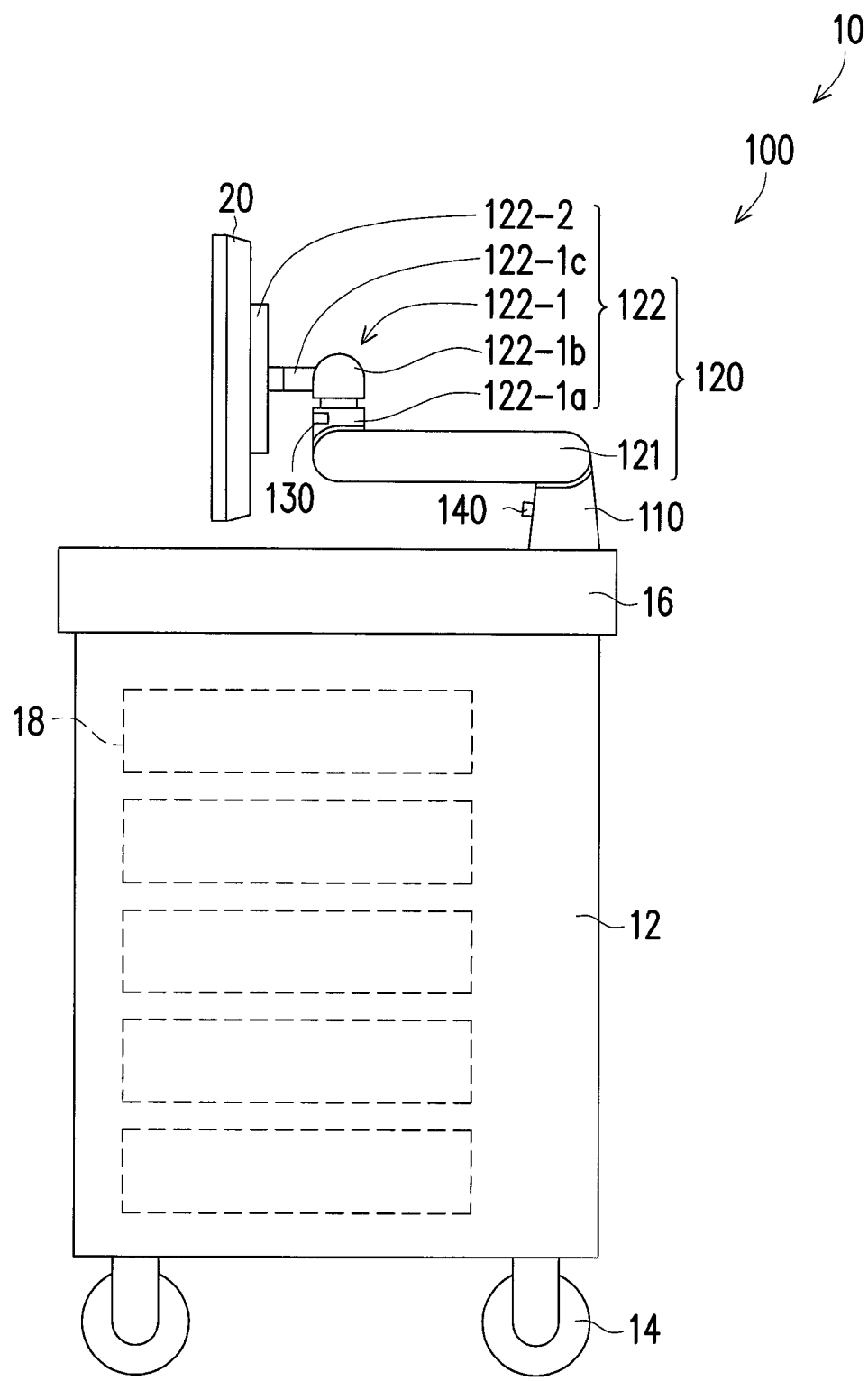
FIG. 1B is a side view illustrating the supporting bracket depicted in FIG. 1A in another posture.

With reference to FIG. 1A and FIG. 1B, in the present embodiment, the supporting arm apparatus 120 has a first segment 121 and a second segment 122. One end portion of the first segment 121 is connected to the base 110. The first segment 121 is rotatable relative to the base 110 on a plane perpendicular to a top surface of the working platform 16. One end portion of the second segment 122 is connected to the other end portion of the first segment 121. The other end portion of the second segment 122 serves to hold the display 20. The second segment 122 is rotatable relative to the first segment 121 on the plane perpendicular to the top surface of the working platform 16. The lighting device 130 is fixed to the second segment 122. Note that an angle between the second segment 122 and the working platform 16 does not vary with a rotation of *the first segment 121.

Figure 2A:
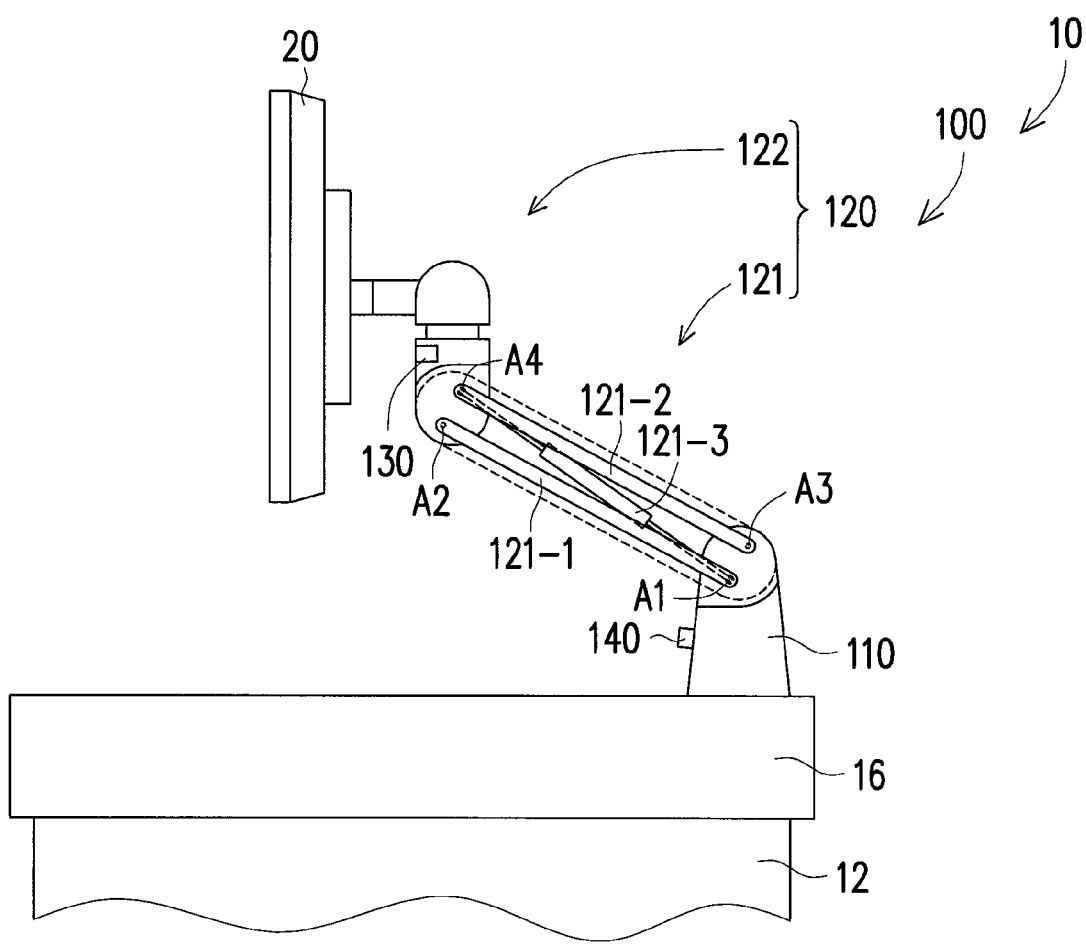
FIG. 2A is an enlarged side view illustrating the supporting bracket depicted in FIG. 1A.
Figure 2B:
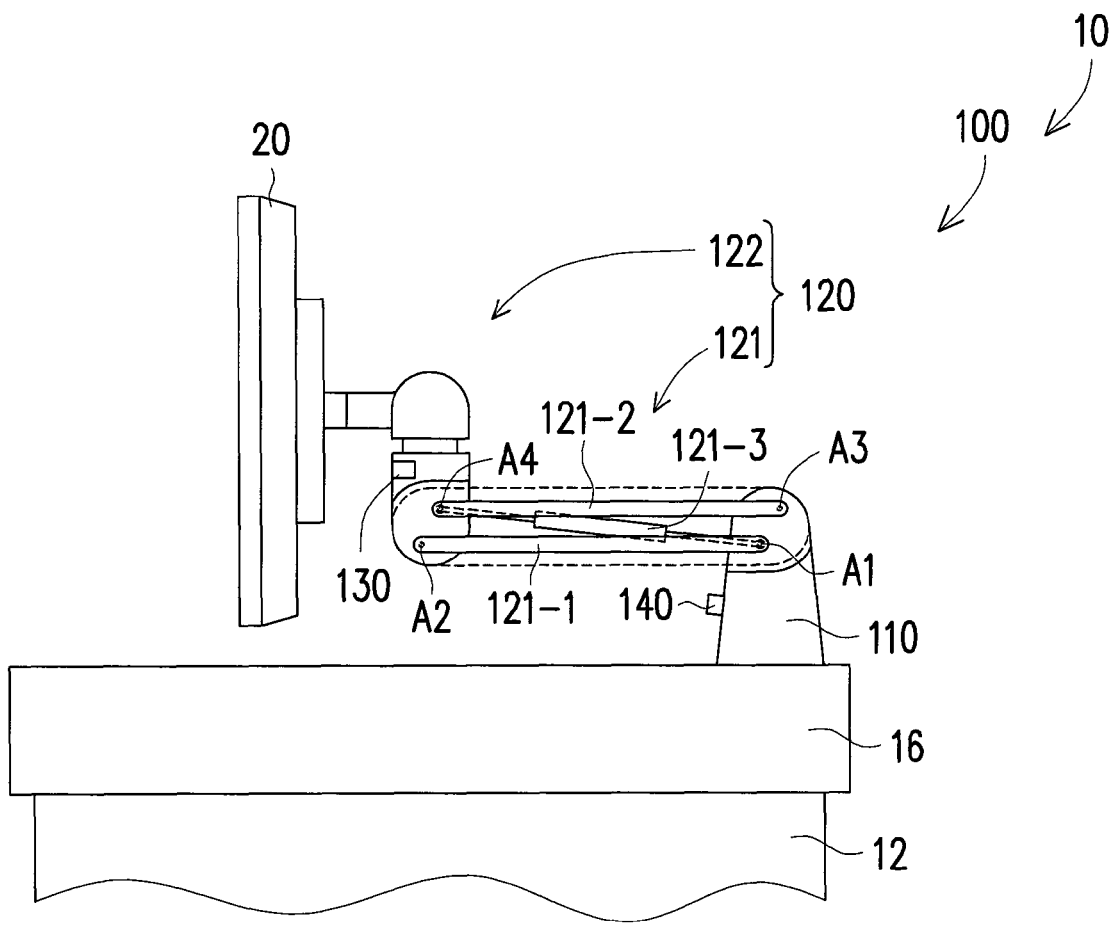
FIG. 2B is an enlarged view illustrating the supporting bracket depicted in FIG. 2A in another posture.

With reference to FIG. 2A, in the present embodiment, in order for the angle between the second segment 122 and the working platform 16 not to vary with the rotation of the first segment 121, the first segment 121 has a first link 121-1, a second link 121-2, and a retractable supporting member 121-3. The retractable supporting member 121-3 is an air pressure bar or an oil pressure bar, for instance. In order to clearly explain the invention, the air pressure bar is taken for example according to the present embodiment. Two ends of the first link 121-1 are pivoted to the base 110 and the second segment 122 through a first rotation axis A1 and a second rotation axis A2, respectively. Two ends of the second link 121-2 are pivoted to the base 110 and the second segment 122 through a third rotation axis A3 and a fourth rotation axis A4, respectively. Two ends of the air pressure bar 121-3 are pivoted to the base 110 and the second segment 122 through the first rotation axis A1 and the fourth rotation axis A4, respectively. Thereby, the base 110, the second segment 122, the first link 121-1, and the second link 121-2 constitute a parallel four-bar linkage. As shown in FIG. 2A and FIG. 2B, through the parallel four-bar linkage, the angle between the second segment 122 and the working platform 16 does not vary with the rotation of the first segment 121, and the air pressure bar 121-3 can temporarily fix the angle between the second segment 122 and the working platform 16 after adjustment.

With reference to FIG. 1A, in the present embodiment, the second segment 122 has a connection arm 122-1 and a fixing device 122-2. One end portion of the connection arm 122-1 is connected to the other end portion of the first segment 121. The connection arm 122-1 is rotatable relative to the first segment 121 on the plane perpendicular to the top surface of the working platform 16. One end portion of the fixing device 122-2 is connected to the other end portion of the connection arm 122-1, and the other end portion of the fixing device 122-2 is configured to fix the display 20. The fixing device 122-2 is rotatable relative to the connection arm 122-1 on a plane perpendicular to a rotational plane of the connection arm 122-1, and the lighting device 130 is fixed to the connection arm 122-1. Similarly, the parallel four-bar linkage shown in FIG. 2A allows the angle between the fixing device 122-2 and the working platform 16 not to vary with the rotation of the first segment 121.

Figure 1C:
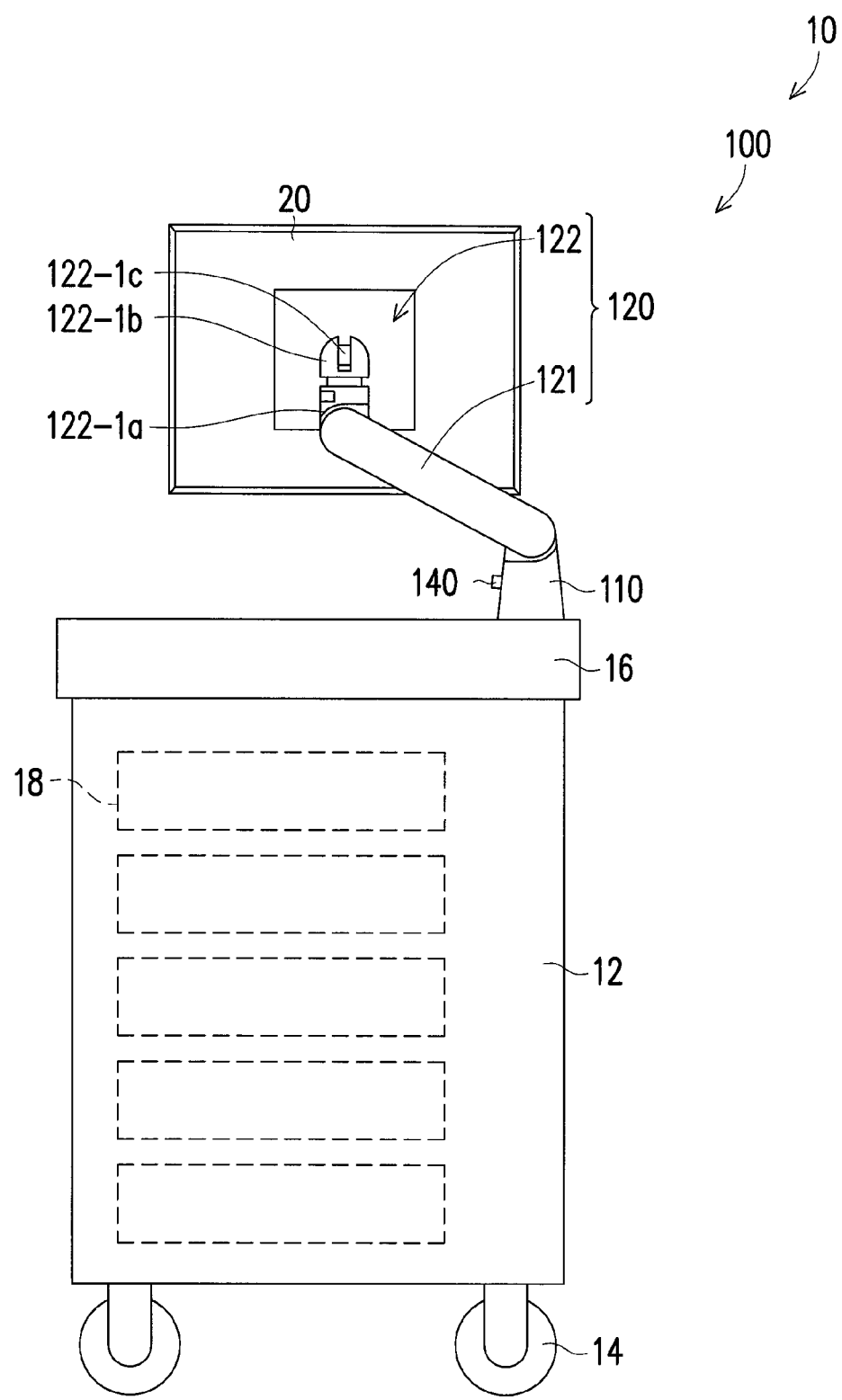
FIG. 1C is a side view illustrating the supporting bracket depicted in FIG. 1A in another posture.
Figure 1D:
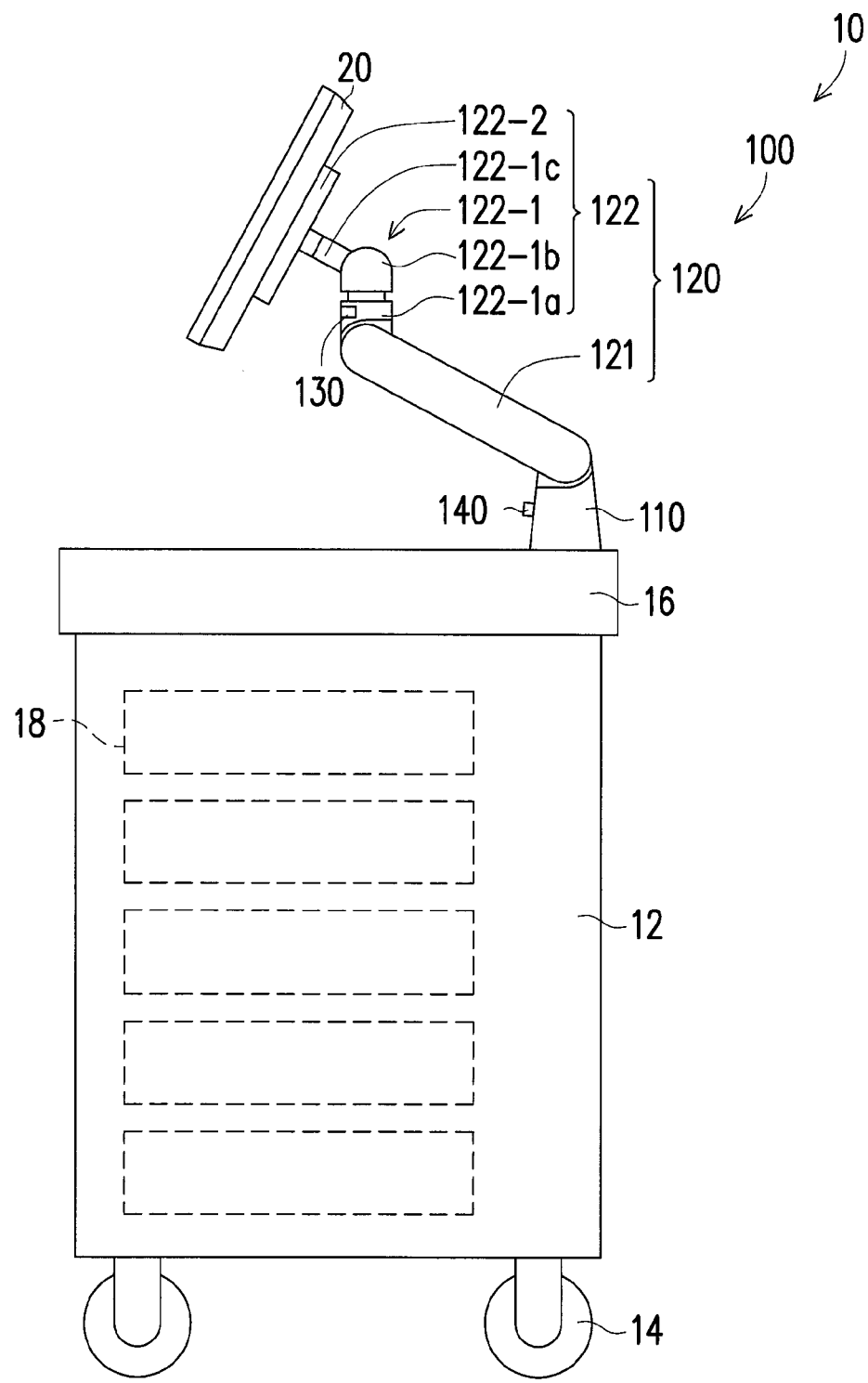
FIG. 1D is a side view illustrating the supporting bracket depicted in FIG. 1A in another posture.
Figure 1E:
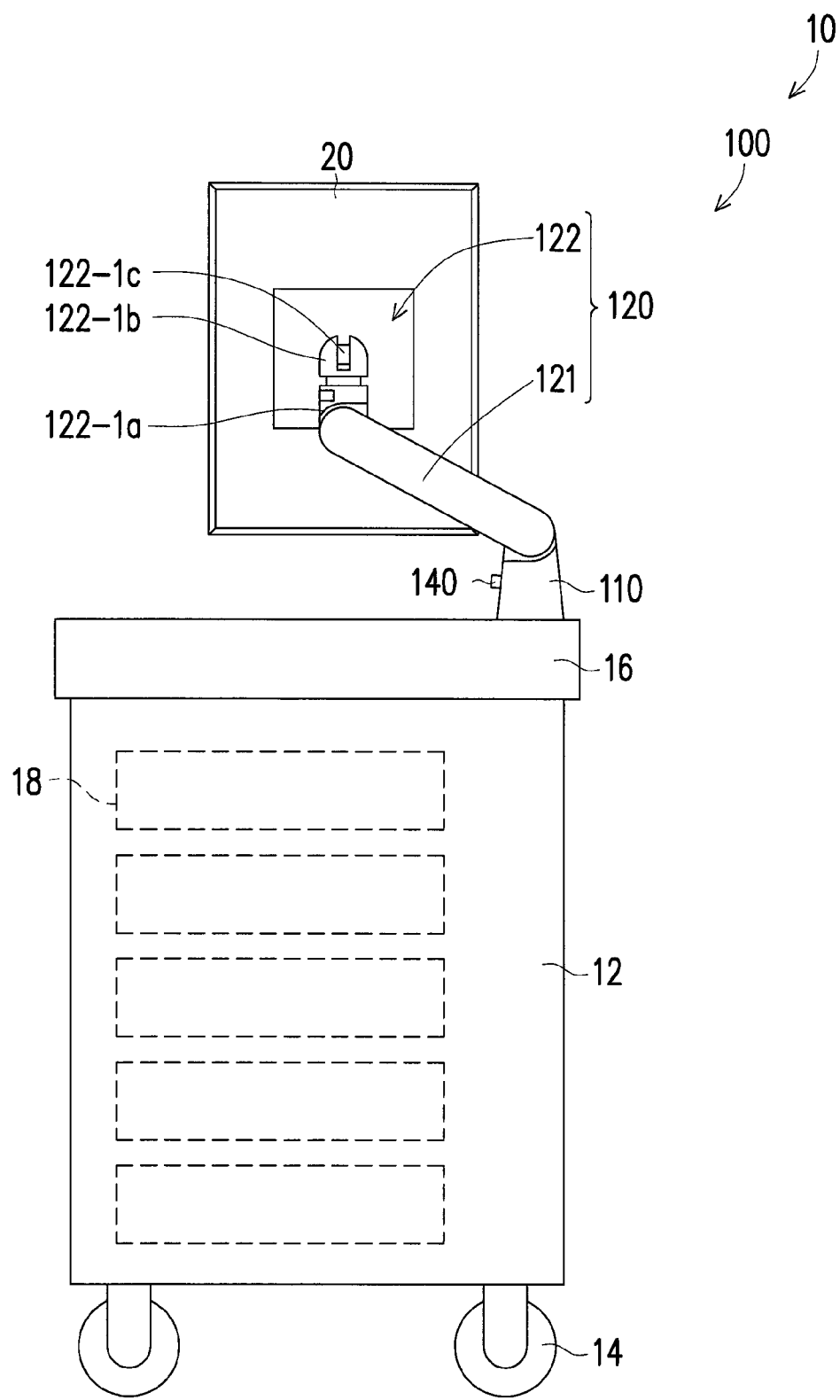
FIG. 1E is a side view illustrating the supporting bracket depicted in FIG. 1A in another posture.

As shown in FIG. 1A, in the present embodiment, the connection arm 122-1 includes a first part 122-1a, second part 122-1b, and a third part 122-1c. The second part 122-1b is rotatable relative to the first part 122-1a on a plane parallel to the top surface of the working platform 16, such that the display 20 is able to rotate to the required position, as shown in FIG. 1C. The third part 122-1c is rotatable relative to the second part 122-1b on a plane perpendicular to the top surface of the working platform 16, such that the display 20 is able to incline to the required position, as shown in FIG. 1D. The fixing device 122-2 is rotatable relative to the third part 122-1c on a plane perpendicular to a rotational plane of the third part 122-1c, such that the display 20 having a lateral configuration can be rotated to have a vertical configuration, as shown in FIG. 1E.

With reference to FIG. 1A, in the present embodiment, the supporting bracket 100 may further have a switch device 140 that can be arranged on the base 110. A user may turn on or turn off the lighting device 130 through the switch device 140.

Figure 3A:
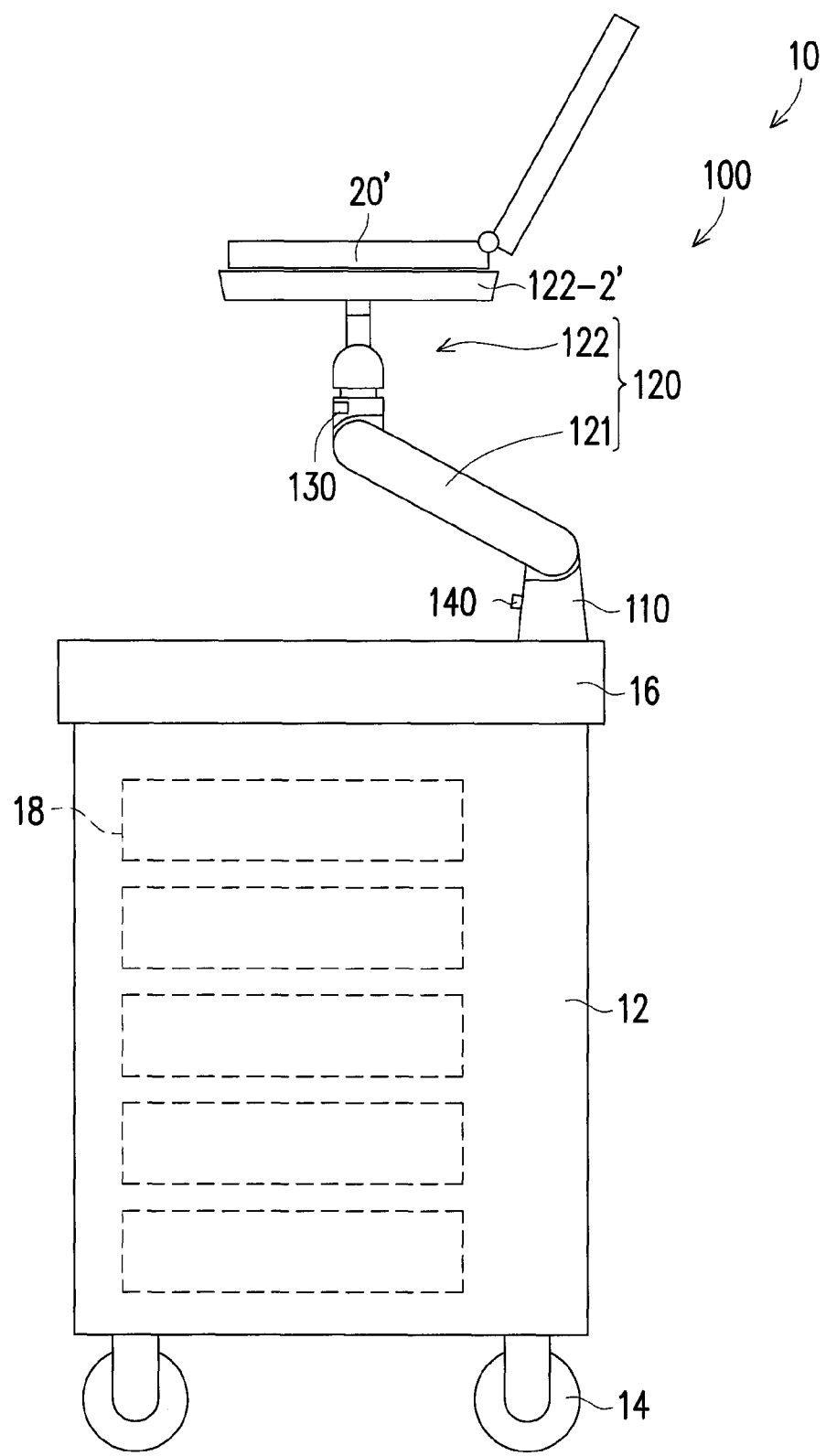
FIG. 3A is a side view illustrating a supporting bracket applied to a medical cart according to another embodiment of the invention.
Figure 3B:
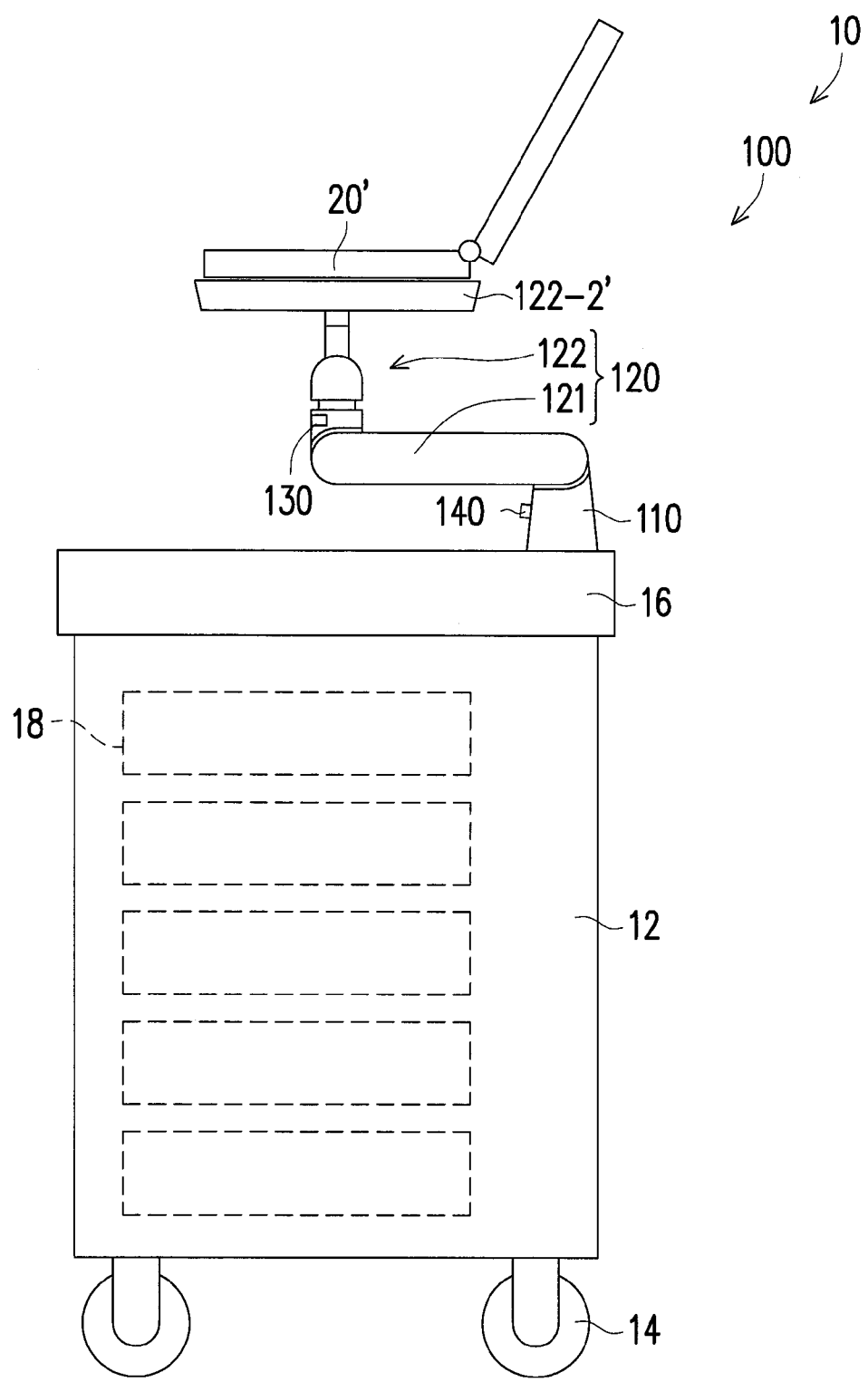
FIG. 3B is a side view illustrating the supporting bracket depicted in FIG. 3A in another posture.

As shown in FIG. 3A and FIG. 3B, in another embodiment of the invention, the fixing device 122-2' may serve to hold a notebook computer 20', and the height and the angle between the notebook computer 20' and the working platform 16 can be adjusted by means of the supporting arm apparatus 120.

To sum up, according to an embodiment of the invention, the electronic device may be moved or rotated to the required position through the supporting bracket; what is more, the lighting device can also be moved to the required location through the supporting bracket. The single supporting bracket is capable of performing two kinds of functions. Moreover, through the parallel four-bar linkage constituted by the first link and the second link of the first segment, the base, and the second segment, the angle between the second segment and the working platform does not vary with the rotation of the first segment, thus facilitating the use of the supporting bracket provided herein.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A supporting bracket suitable for standing on a working platform and adapted to hold an electronic device and provide illumination, the electronic device having a screen, the supporting bracket comprising:
    a base suitable for being fixed to the working platform;
    a supporting arm apparatus having a first segment and a second segment, wherein one end portion of the first segment is connected to the base, the first segment is rotatable relative to the base, one end portion of the second segment is connected to the other end portion of the first segment, the other end portion of the second segment is adapted to hold the electronic device, and the second segment is rotatable relative to the first segment; and
    a lighting device fixed to the second segment of the supporting arm apparatus and adapted to be moved to a required lighting position through changing the posture of the supporting arm apparatus to provide illumination.

2. The supporting bracket according to claim 1, wherein an angle between the second segment and the working platform does not vary with a rotation of the first segment.

3. The supporting bracket according to claim 2, wherein the first segment has a first link, a second link, and a retractable supporting member, two ends of the first link are pivoted to the base and the second segment through a first rotation axis and a second rotation axis, respectively, two ends of the second link are pivoted to the base and the second segment through a third rotation axis and a fourth rotation axis, respectively, two ends of the retractable supporting member are pivoted to the base and the second segment through the first rotation axis and the fourth rotation axis, respectively, and the base, the second segment, the first link, and the second link constitute a parallel four-bar linkage.

4. The supporting bracket according to claim 3, wherein the retractable supporting member is an air pressure bar or an oil pressure bar.

5. The supporting bracket according to claim 1, wherein the second segment has a connection arm and a fixing device, one end portion of the connection arm is connected to the other end portion of the first segment, the connection arm is rotatable relative to the first segment, one end portion of the fixing device is connected to the other end portion of the connection arm, the other end portion of the fixing device is configured to fix the electronic device, the fixing device is rotatable relative to the connection arm, and the lighting device is fixed to the connection arm.

6. The supporting bracket according to claim 5, wherein an angle between the fixing device and the working platform does not vary with a rotation of the first segment.

7. A medical cart comprising:
a body;
a working platform arranged on a top portion of the body;
a plurality of wheels arranged on a bottom portion of the body; and
a supporting bracket standing on the working platform for holding an electronic device and providing illumination, the electronic device having a screen, the supporting bracket comprising:
a base fixed to the working platform;
a supporting arm apparatus having a first segment and a second segment, wherein one end portion of the first segment is connected to the base, the first segment is rotatable relative to the base, one end portion of the second segment is connected to the other end portion of the first segment, the other end portion of the second segment is adapted to hold the electronic device, and the second segment is rotatable relative to the first segment; and
a lighting device fixed to the second segment of the supporting arm apparatus and adapted to be moved to a required lighting position through changing the posture of the supporting arm apparatus to provide illumination.

8. The medical cart according to claim 7, wherein an angle between the second segment and the working platform does not vary with a rotation of the first segment.

9. The medical cart according to claim 8, wherein the first segment has a first link, a second link, and a retractable supporting member, two ends of the first link are pivoted to the base and the second segment through a first rotation axis and a second rotation axis, respectively, two ends of the second link are pivoted to the base and the second segment through a third rotation axis and a fourth rotation axis, respectively, two ends of the retractable supporting member are pivoted to the base and the second segment through the first rotation axis and the fourth rotation axis, respectively, and the base, the second segment, the first link, and the second link constitute a parallel four-bar linkage.

10. The medical cart according to claim 7, wherein the second segment has a connection arm and a fixing device, one end portion of the connection arm is connected to the other end portion of the first segment, the connection arm is rotatable relative to the first segment, one end portion of the fixing device is connected to the other end portion of the connection arm, the other end portion of the fixing device is configured to fix the electronic device, the fixing device is rotatable relative to the connection arm, and the lighting device is fixed to the connection arm.

11. The medical cart according to claim 10, wherein an angle between the fixing device and the working platform does not vary with a rotation of the first segment.

12. The medical cart according to claim 7, wherein the body has a plurality of pill boxes for holding pills.

13. A supporting bracket suitable for standing on a working platform and adapted to hold an electronic device and provide illumination, the electronic device having a screen, the supporting bracket comprising:
a base suitable for being fixed to the working platform;
a supporting arm apparatus having a first segment and a second segment, wherein one end portion of the first segment is connected to the base, the first segment is rotatable relative to the base, one end portion of the second segment is connected to the other end portion of the first segment, the other end portion of the second segment is adapted to hold the electronic device, and the second segment is rotatable relative to the first segment; and
a lighting device fixed to the supporting arm apparatus and adapted to be moved to a required lighting position through changing the posture of the supporting arm apparatus to provide illumination.

14. The supporting bracket according to claim 13, wherein the lighting device is fixed to the second segment.

15. The supporting bracket according to claim 14, wherein the second segment has a connection arm and a fixing device, one end portion of the connection amr is connected to the other end portion of the first segment, the connection arm is rotatable relative to the first segment, one end portion of the fixing device is connected to the other end portion of the connection arm, the other end portion of the fixing device is configured to fix the electronic device, the fixing device is rotatable relative to the connection arm, and the lighting device is fixed to the connection arm.

* * * * *